United States Patent Office 2,735,068
Patented Feb. 14, 1956

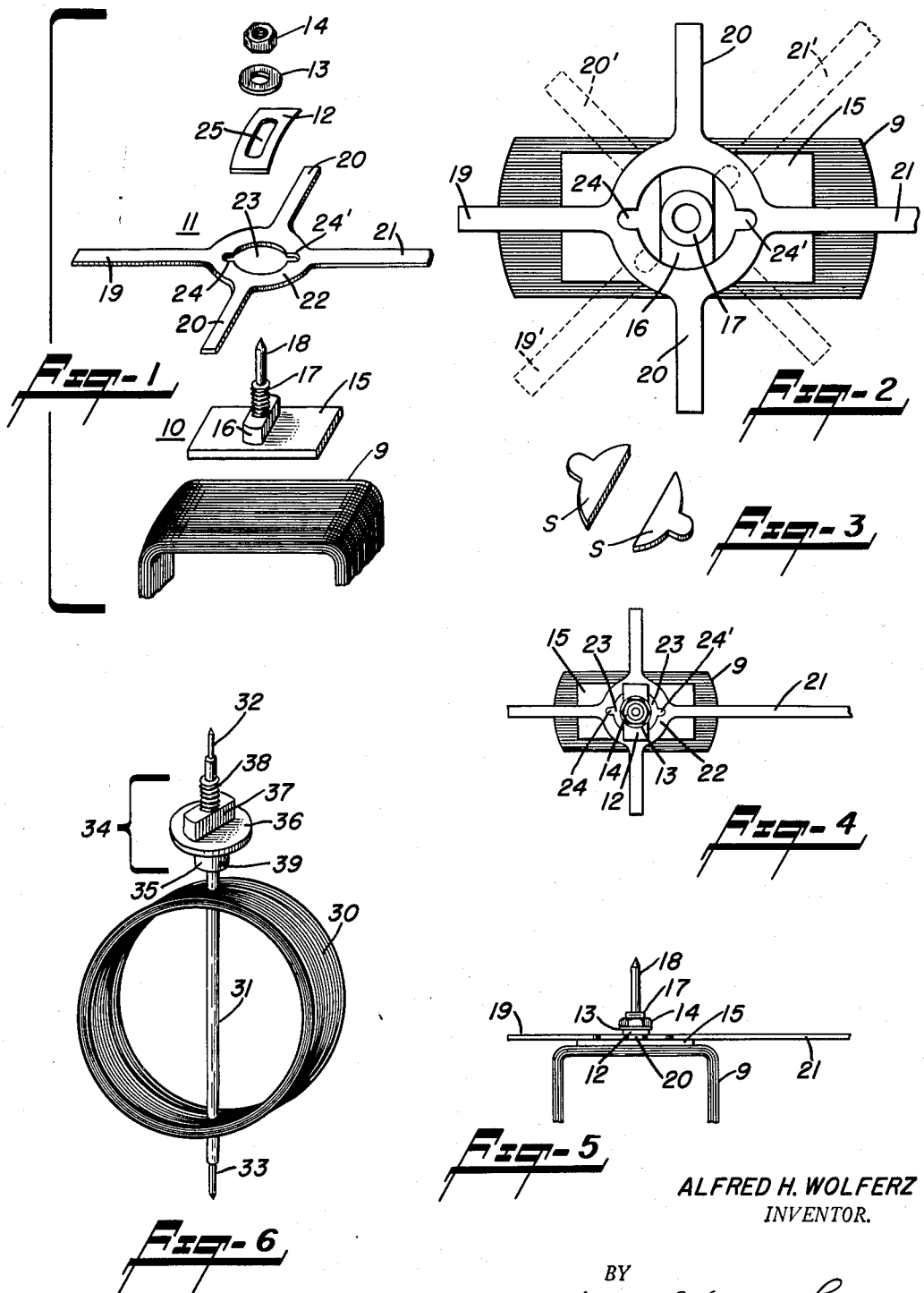

2,735,068

POINTER ASSEMBLY FOR AN ELECTRICAL INSTRUMENT

Alfred H. Wolferz, Hillside, N. J., assignor to Weston Electrical Instrument Corporation, Newark, N. J., a corporation of New Jersey Application December 13, 1951, Serial No. 261,533

9 Claims. (Cl. 324—154)

This invention relates to electrical instruments and more particularly to a novel arrangement for securing an indicating pointer to a movable coil to establish a precise angular relation between the pointer and the coil after the instrument is completely assembled.

For purposes of this invention, an electrical indicating instrument may be considered as comprising a pivotally-mounted movable coil having an indicating pointer securely attached thereto, said coil operating in a magnetic flux field. The pointer cooperates with a suitably calibrated scale. In the instruments designed for certain applications it is often essential that the position of the pointer, relative to the movable coil, be established precisely. This is particularly the case in instruments designed for operation on alternating current wherein it is necessary to set the pointer to a given scale mark when the movable coil is in a position wherein the mutual inductance between the movable coil and the fixed, field coils is zero. Because of variations in the normal tolerance of mechanical parts and, more importantly, variations in the distribution of the magnetic flux field, it becomes necessary to make the final adjustment of the pointer position after the movable mechanism has been assembled in the jewel bearings and disposed within the flux field. When the pointer is made of relatively thin tubing, or small diameter rod, it is possible to bend the pointer slightly to correct for a small misalinement of the coil and pointer. However, such operation is not entirely satisfactory as there is a possibility of permanently damaging the pointer, the coil winding, or the delicate pivots. When, as is generally the case, the pointer is of sturdy construction such bending of the pointer in the assembled instrument is not possible. In the latter case it is the practice to disassemble the movable mechanism, loosen the pointer-fastening nuts to shift the pointer, reassemble the mechanism, energize the instrument and rely upon the experience of the operator for a minimizing of such adjustment cycles to obtain the required, precise pointer position under the stated conditions. The fact that the movable coil must be subjected to the influence of the particular magnetic field flux in order to establish the true electrical zero position thereof makes it difficult, if not impossible, to loosen the conventional pointer-securing nuts as, obviously, the movable coil is pivotally mounted in the associated jewel bearings during the test period.

An object of this invention is the provision of a novel arrangement for securing an indicating pointer to a pivotally-mounted movable coil whereby the relative angular position between the pointer and coil can be adjusted while the instrument is in assembled condition.

An object of this invention is the provision of a novel movable coil-pointer assembly for an electrical instrument.

An object of this invention is the provision of a movable coil-pointer assembly for an electrical instrument said assembly comprising a balance cross including a hub having a circular aperture therein, diametrically-opposed recesses communicating with said aperture, a support member secured to the movable coil, and a rectangular boss secured to the said member, said boss having arcuate ends disposed within the circular aperture in the said hub.

An object of this invention is the provision of a movable coil-pointer assembly for an electrical instrument comprising a pointer including a hub having a circular aperture therein, said aperture including diametrically-opposed recesses, a pivot base secured to the movable coil, said base having an upstanding, rectangular boss frictionally positioned within the said aperture and fastening means retaining the pointer on the pivot base.

These and other objects and advantages will become apparent from the following description when taken with the accompanying drawings. It will be understood the drawings are for purposes of illustration and are not to be construed as defining the scope or limits of the invention, reference being had for the latter purpose to the appended claims.

In the drawings wherein like reference characters denote like parts in the several views:

Figure 1 is an exploded, isometric view showing the individual parts for providing a movable coil-pointer assembly in accordance with this invention;

Figure 2 is a top view, drawn to an enlarged scale, and showing the pointer mounted on the pivot base that is secured to the movable coil;

Figure 3 is an isometric view of the slugs formed by cement inserted into the openings between the aperture in the pointer hub and the upright rectangular boss of the pivot base;

Figure 4 is a top view showing the assembly of the parts shown in Figure 1;

Figure 5 is a side view of the assembly of Figure 4; and

Figure 6 is an isometric view of another embodiment of the invention.

Referring now to Figure 1, there is shown a wire-wound movable coil 9, a pivot base 10, a pointer 11, a compression washer 12, a flat washer 13 and a nut 14. The pivot base 10 is an integral, metallic member and comprises the rectangular, flat bottom portion 15, an upstanding nearly rectangular boss 16 and an externally-threaded cylindrical portion 17, the latter including an axial bore for accommodation of the pointed pivot 18. The boss 16 has arcuate ends and its length is somewhat less than the maximum width of the bottom portion 15, substantially as shown. The more or less conventional pointer may be formed from flat stock to provide the tail 19, cross arms 20, and the relatively-long indicating arm 21, all terminating in the hub section 22. As is well known, the cross arms and the tail may carry adjustable weights for balancing the movable mechanism and the long arm 21 may be pointed or provided with a knife edge affording accurate reading of the instrument scale. Further, I use the term pointer only in a representative sense since the member 11 may be a conventional balance cross to which various attachments may be added as is well known by those skilled in the instrument art. In accordance with this invention, the hub section of the pointer, or balance cross, includes a circular aperture 23 communicating with the diametrically-opposed recesses 24, 24'. It may here be pointed out that the diameter of the aperture 23, in the hub, is just slightly larger than the diameter of the arcuate ends of the upstanding boss 16 on the pivot base 10. Thus, when the pointer is placed into flush contact with the bottom 15, of the pivot base, the boss 16 will fit snugly within the pointer aperture 23 affording angular rotation of the pointer relative to the pivot base.

Reference is now made to Figure 2 showing a sub-assembly of the movable coil, pivot base and pointer. The bottom portion 15 of the pivot base is secured to the top of the coil by a suitable cement. The upstanding boss 16 fits snugly within the circular aperture in the pointer hub thereby preventing lateral displacement of the pointer while permitting angular rotation of the pointer relative to the movable coil. If it be assumed the movable coil 9 is mounted in an assembled instrument and the instrument field coils are energized to establish a magnetic flux field, the movable coil will occupy its true electrical zero position when the movable coil is short circuited. Under such condition, a precise alinement of the pointer with a fixed point coinciding with the mechanical zero mark on the instrument scale plate can be accomplished by merely rotating the pointer with respect to the pivot base. When such positioning of the pointer is completed a drop or two of suitable cement is placed into each of the two cavities between the hub 16 and the walls defining the aperture in the pointer hub. Upon hardening, the cement forms two solid slugs S having the form shown in Figure 3. These slugs firmly lock the pointer to the pivot base preventing further rotation of one relative to the other. Since the slugs take the precise form of the cavity between the pointer and the boss of the pivot base, it will be apparent this method of securing the pointer to the pivot base does not depend upon a given alinement of the pointer or coil. That part of each slug which corresponds to the recesses 24, 24' in the pointer hub serves as a key to lock the parts against relative angular rotation so that reliance is not placed upon the adhesive character of the cement for the locking action.

While the above-described locking means serves to prevent relative rotation between the pointer and the movable coil, when the cement has been hardened, it is desirable to provide a simple means to prevent separation of the pointer from the pivot base in the direction of the rotational axis of the coil. This is accomplished by means of the metallic washers 12, 13 and the nut 14, shown in Figure 1. The rectangular spring washer 12 has a length exceeding the diameter of the circular aperture 23 in the pointer hub and is provided with an aperture 25 that corresponds, in shape, to the rectangular boss 16 of the pivot base. Thus, the washer 12 can be inserted over the boss to span the hub 22, with the threaded section 17, of the pivot base, protruding through the aperture 25. It will be noted that the rectangular washer has a slight initial curvature. Consequently, when the flat washer 13 is inserted over the washer 12, and the nut 14 is threaded home on the pivot base section 17, the ends of the washer 12 will exert a pressure against the pointer hub.

The assembly of the parts shown in Figure 1 is illustrated in Figures 4 and 5, being top and side views, respectively. Since the pointer is frictionally clamped between the rectangular spring washer 12 and the bottom 15, of the pivot base, the pointer can be rotated angularly relative to the movable coil. Further, since the spring washer 12 is prevented from turning relative to the pivot base, such angular rotation of the pointer will not loosen the locking nut 14. The parts are so designed that the pointer can be rotated by the application of only a relatively small force thereby eliminating the possibility of damage to the parts. As clearly shown in Figure 4, portions of the pointer aperture 23 and the complete recesses 24, 24' are accessible from the top of the assembled mechanism. When the proper angular disposition of the pointer is obtained a suitable cement is placed into the cavities represented by such recesses and aperture sections. This can be done quite readily by means of a suitable tool similar to a hypodermic syringe. Whether an air-drying or baking cement is used is immaterial. In any case, the desired relation between the pointer and the coil is maintained until the cement hardens to form the solid, locking slugs.

I have described one specific embodiment of my invention wherein the pivot base includes a relatively large, flat base portion 15 that is cemented to the movable coil. Since the aperture 23, in the pointer hub, has a diameter substantially less than the width of such base portion, the base portion provides a bottom for the cavity into which the fluid cement is placed. Certain conventional pivot bases do not include such large-area base portion. In the latter case it is preferable to mount a flat washer on the pivot base. Such flat washer serves as a bottom for the cement-retaining cavity.

Another embodiment of my invention is shown in Figure 6. Here I show a circular movable coil 30 of the type having a staff 31 extending therethrough, said staff carrying the pivots 32, 33. The pointer support comprises a collet 34 including a shank 35, flat base 36, a generally rectangular boss 37 and the threaded cylindrical section 38. When the collet is secured to the staff, as by the pin 39, such collet serves the same purpose as the pivot base 10 of the Figure 1 embodiment of the invention, as is quite apparent.

The specific form of the diametrically-opposed recesses in the pointer hub is not critical, their function being to provide an integral projection in the slug to serve as a key-lock preventing relative rotation between the pointer and the pivot base. Such key-lock slug formation results even though the final pointer position varies considerably from the median plane of the movable coil as shown, for example, by the dotted line position of the balance cross in Figure 2.

Having now described several specific embodiments of my invention those skilled in this art will have no difficulty in making certain changes and modifications to meet required conditions with respect to specific applications of the invention. Such changes and modification may be made without departing from the scope and spirit of the invention as set forth in the following claims.

I claim:

1. An arrangement for securing a pointer to the rotatable member of an electrical instrument, said arrangement comprising a support rotatable with the member and including a rectangular boss having arcuate ends; a flat hub in the pointer, said hub being provided with a circular aperture having a diameter slightly larger than that of the arcuate ends of said boss and diametrically-opposed recesses communicating with the aperture; and solid slugs filling the cavities formed between the sides of the rectangular boss and the recessed portions of the pointer hub when the pointer is assembled on the support so that the hub abuts the surface of the support with the said boss extending into the said aperture.

2. The invention as recited in claim 1, wherein the slugs comprise hardened cement.

3. The invention as recited in claim 1, wherein the support comprises a pivot base including a flat portion cemented to the rotatable member.

4. The invention as recited in claim 1, wherein the rotatable member is mounted on a staff and said support is secured to said staff.

5. An arrangement for securing a pointer to the rotatable coil of an electrical instrument, said arrangement comprising a pointer support rotatable with the coil, said support including a flat base section, a rectangular boss having arcuate ends and an externally-threaded cylindrical section; a hub in the pointer, said hub including a circular aperture having a diameter slightly larger than that of the arcuate ends of said boss such that the boss extends through the hub aperture when the hub abuts against the said base section; a set of recesses in the hub and communicating with the hub aperture, such recesses spaced laterally from the sides of said rectangular boss; a spring washer disposed over the rectangular boss and spanning the pointer hub; a nut threaded on the said cylindrical section and urging the spring washer into contact with the hub; and solid slugs filling the cavities formed between the sides of the rectangular boss and the pointer hub.

6. The invention as recited in claim 5, wherein the slugs are hardened cement.

7. The invention as recited in claim 5, wherein the height of the rectangular boss is substantially equal to the thickness of the pointer hub and the spring washer.

8. The invention as recited in claim 5, wherein the flat base section of the pointer support is cemented to the coil.

9. The invention as recited in claim 5, wherein the coil is secured to a staff and said pointer support is secured to the staff.

References Cited in the file of this patent

UNITED STATES PATENTS

| | | |
|---|---|---|
| 611,722 | Weston | Oct. 4, 1898 |
| 1,011,285 | Verplast | Dec. 12, 1911 |
| 1,741,588 | Schneider | Dec. 31, 1929 |
| 2,059,867 | Hinds | Nov. 3, 1936 |
| 2,426,777 | Lingel | Sept. 2, 1947 |
| 2,585,646 | Frye | Feb. 12, 1952 |